US006882082B2

United States Patent
Greeff et al.

(10) Patent No.: US 6,882,082 B2
(45) Date of Patent: Apr. 19, 2005

(54) MEMORY REPEATER

(75) Inventors: Roy Greeff, Boise, ID (US); David Ovard, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 500 days.

(21) Appl. No.: 09/804,224

(22) Filed: Mar. 13, 2001

(65) Prior Publication Data

US 2004/0225777 A1 Nov. 11, 2004

(51) Int. Cl.[7] .............................................. G06F 13/00
(52) U.S. Cl. ........................... 310/307; 710/301; 711/5; 365/223
(58) Field of Search ................................ 710/301, 307, 710/311, 316; 711/5, 100, 154; 365/223

(56) References Cited

U.S. PATENT DOCUMENTS

| 5,081,648 | A |   | 1/1992  | Herzog |             |
|-----------|---|---|---------|--------|-------------|
| 5,623,644 | A |   | 4/1997  | Self et al. |        |
| 5,703,806 | A | * | 12/1997 | Puar et al. ................... 365/181 |
| 5,978,880 | A | * | 11/1999 | Bruce et al. ................. 710/316 |
| 6,317,352 | B1| * | 11/2001 | Halbert et al. ................ 365/52 |
| 6,446,174 | B1| * | 9/2002  | Dow ........................... 711/154 |
| 6,477,614 | B1| * | 11/2002 | Leddige et al. ................ 711/5 |
| 6,493,250 | B1| * | 12/2002 | Halbert et al. ................ 365/63 |
| 6,587,912 | B1| * | 7/2003  | Leddige et al. ................ 711/5 |
| 6,625,687 | B1| * | 9/2003  | Halbert et al. .............. 711/105 |

OTHER PUBLICATIONS

Gustavson, D., "SCIzzL: The Local Area Memory Port," http://www.scizzl.com, 9 pages, reviewed Oct. 2, 2000.
Gustavson, D. "SCI Industrial Takeup and Future Developments," http://www.scizzl.com/Perspectives.html, 13 pages, reviewed Oct. 2, 2000.
"Hot Rod™ High–Speed Serial Link Gallium Arsenide," Gazelle Microcircuits, Inc. pp. 1–35.

* cited by examiner

*Primary Examiner*—Glenn A. Auve
(74) *Attorney, Agent, or Firm*—Dickstein Shapiro Morin & Oshinsky LLP

(57) ABSTRACT

A method and associated apparatus are provided for improving the performance of a high speed data bus, such as a memory bus, using selectively activated receiver and driver pairs. Each receiver and driver pair may be selectively activated to permit data communication on a segment of the high speed data bus coupled to the activated receiver and driver pair. Each receiver and driver pair may also be deactivated, thereby disconnecting at least a respective segment of the high speed data bus, so that communicating system components may be connected in a substantially stubless environment.

48 Claims, 12 Drawing Sheets

MEMORY REPEATER

FIELD OF THE INVENTION

The present invention relates to improving the performance of a high speed bus for data communications.

BACKGROUND OF THE INVENTION

Memory device manufacturers are under continuous pressure to increase the performance and reduce the cost of memory devices. Memory systems for computers typically provide many memory devices on a common multidrop bus to allow larger storage and transmission capacities than can be obtained with a single memory device. To improve the maximum throughput of the bus, data communicated to and from the memory devices may be multiplexed for transmission on the bus, thereby reducing the pin count of a memory bus master or controller. For example, a 64-bit wide data word may be transmitted over a 16 bit data bus as four successive 16-bit data word portions.

In addition, such systems typically include user upgradable or replaceable components to allow future expansion or repair of the memory subsystems. Typically, these systems are upgraded on a module basis, where the memory module (e.g., a dual in-line memory module or DIMM) includes several memory devices on a small printed circuit board (PCB), and the module plugs into a connector that provides an electrical connection to the memory subsystem bus.

Connection of multiple memory devices to the bus can degrade the performance of the bus since the modules are typically connected in a configuration having electrical stubs which cause signal reflections on the bus. These reflections degrade signal integrity, thus limiting the maximum speed and bandwidth of the system. A robust electrical design is required in a high speed multidrop memory bus since the signal integrity must be acceptable throughout the system for lightly loaded systems, that is, where only a small number of module slots are populated, as well as heavily loaded systems where every module slot, or nearly every module slot, is populated.

Accordingly, there is a strong desire and need to improve the performance characteristics of memory bus systems and other data bus systems in order to permit high speed operation with minimal degradation of signal integrity due to bus reflections.

SUMMARY OF THE INVENTION

The present invention provides a method and associated apparatus for improving the performance of a high speed data bus, such as a memory bus, using selectively activated receiver and driver pairs. Each receiver and driver pair may be selectively activated to permit data communication on a segment of the high speed data bus coupled to the activated receiver and driver pair. A receiver and driver pair may accordingly be deactivated, thereby disconnecting at least a respective segment of the high speed data bus, so that communicating system components may be connected in a substantially stubless environment.

In one aspect, the invention provides an interface circuit for a segmented high speed data bus including a plurality of receiver and driver pairs, wherein each receiver and driver pair is connected to a segment of the high speed bus. The interface circuit may also receive a selection signal indicating operations to be performed using the receiver and driver pairs. When the selection signal selects the interface circuit, e.g., for READ or WRITE operations, one of the receiver and driver pairs is activated to permit substantially point-to-point data communications between the interface circuit and another device connected to the high speed data bus. When the interface circuit is not selected for operation, more than one receiver and driver pair is activated so that the interface circuit may receive data at a receiver connected to a first segment and place the data on a second segment of the high speed data bus using a driver connected to the second segment.

In another aspect, the invention provides a method of data communication between data exchanging devices which maintains a substantially stubless environment. A first set of I/O pins and a second set of I/O pins are provided at each data input/output device, e.g., a memory module, for connecting first and second receiver/driver pairs to respective first and second segments of a high speed data bus. Data is received and transmitted on the data bus using at least the first receiver/driver pair through the first set of I/O pins, and data on the data bus is selectively passed through from the first bus segment to the second bus segment using the first receiver and the second driver, and from the second bus segment to the first bus segment using the second receiver and the first driver.

BRIEF DESCRIPTION OF THE DRAWINGS

The foregoing and other features and advantages of the invention will become more apparent from the detailed description of the exemplary embodiments of the invention given below with reference to the accompanying drawings in which.

DETAILED DESCRIPTION OF THE PREFERRED EMBODIMENTS

The invention provides a bus system and associated devices which may be used to interconnect data input/output devices. While the invention is described below with reference to a memory system, including memory devices as representative data input/output devices, it should be understood that the invention may be used with any type of data input/output device. Likewise, it should be understood that the memory controller described in the context of a memory system may be a bus controller for use with other data input/output devices.

Figure 1:
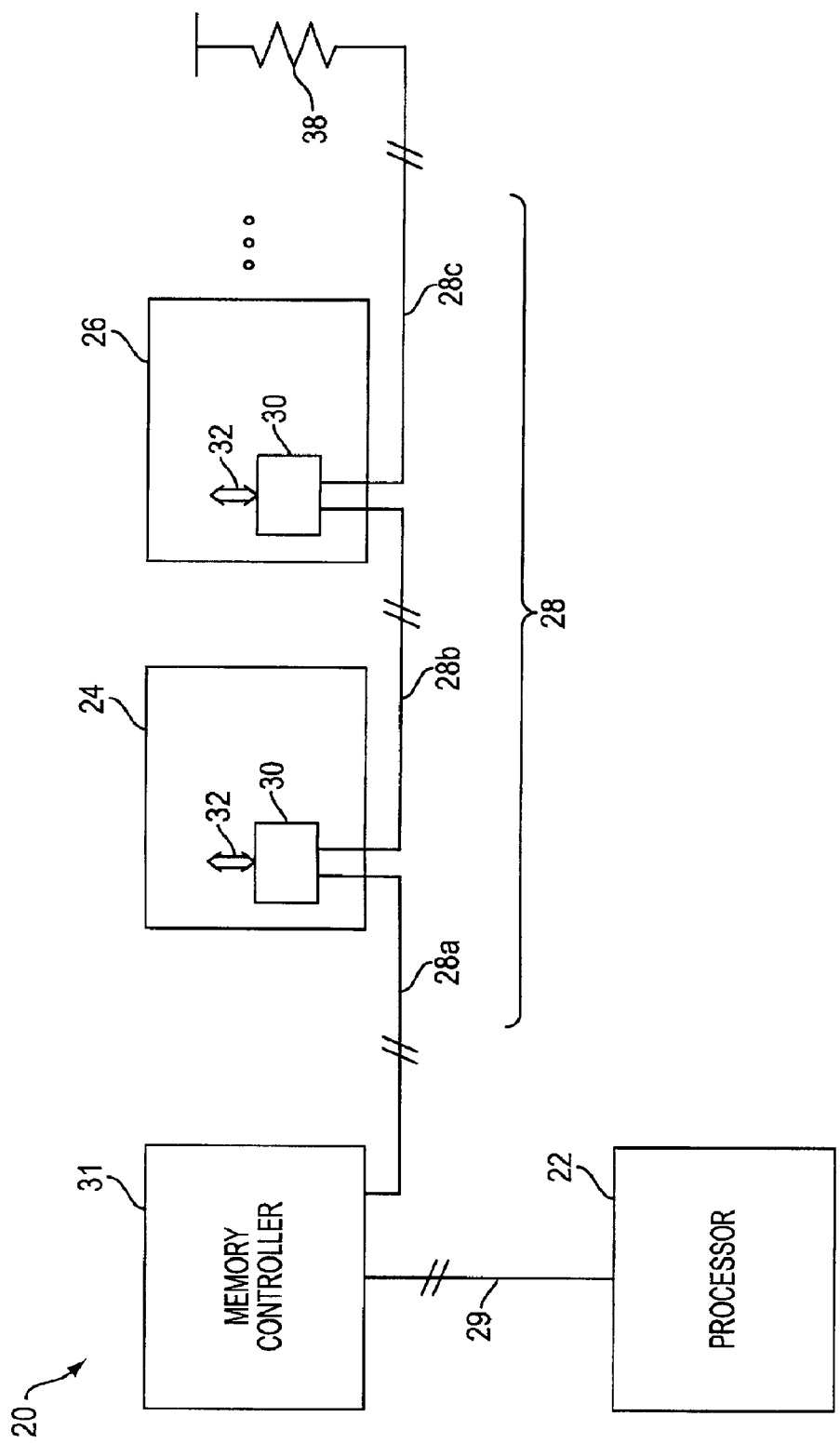
FIG. 1 illustrates a bus topology formed in accordance with an exemplary embodiment of the invention.

Referring to FIG. 1, an exemplary processor system 20 including a memory subsystem is illustrated employing a high speed bus system and receiver/driver pairs in accordance with the invention. The processor system 20 includes several data input/output devices, which take the form of memory modules 24, 26, connected to a memory controller 31 by a segmented data bus 28, and a processor 22 connected to the memory controller 31 via a conventional bus 29. Each of the memory modules 24, 26 has an associated integrated interface circuit 30 for connection to the segmented data bus 28 through receiver/driver pairs. Each integrated interface circuit 30 permits data exchange between the segmented data bus 28 and another data pathway, for example, a second data bus 32, shown at each of the respective memory modules 24, 26. The second data bus 32 is connected to individual memory devices, e.g., DRAM chips, provided on the modules 24, 26. The segmented data bus 28 may terminate in a bus terminator, for example a bus terminating resistor 38.

Although two memory modules 24, 26 are illustrated, it should be understood that any number of memory modules may be connected to bus 28 in accordance with the invention.

The segmented data bus 28 may be a conventional m-bit parallel bus having command and address paths, data paths, and clock (timing) paths. The segmented data bus 28 may have a bus width of any number of parallel data paths, but typically has fewer data paths than a second data bus 32 attached to the interface circuit 30. As one example, the segmented data bus 28 may be 16 bits wide (16 data paths) while the second data bus 32 may be 64 bits wide (64 data paths). Accordingly, and as described below, data from the memory devices connected to the wide bus 32 can be multiplexed by interface circuit 30 onto the narrower bus 28, while data on bus 28 can be demultiplexed and placed on bus 32. Accordingly, bus 28 operates at a higher data transfer speed than bus 32, enabling memory modules 24, 26 to use lower speed memory devices than would otherwise be required with a high speed bus.

Since the segmented data bus 28 has a smaller number of data paths than data bus 32, the integrated interface circuits 30 connect to the segmented data bus 28 with a low pin count connection.

As shown in FIG. 1, each of the memory modules 24, 26 is connected to two segments of the segmented data bus 28. In this way, memory modules 24, 26 on the segmented data bus 28 are connected in a "daisy chain." This configuration substantially eliminates bus reflections caused by electrical stubs by connecting system components in a substantially stubless configuration which improves the signal integrity and hence the maximum data rate which can be achieved on bus 28.

Figure 2:
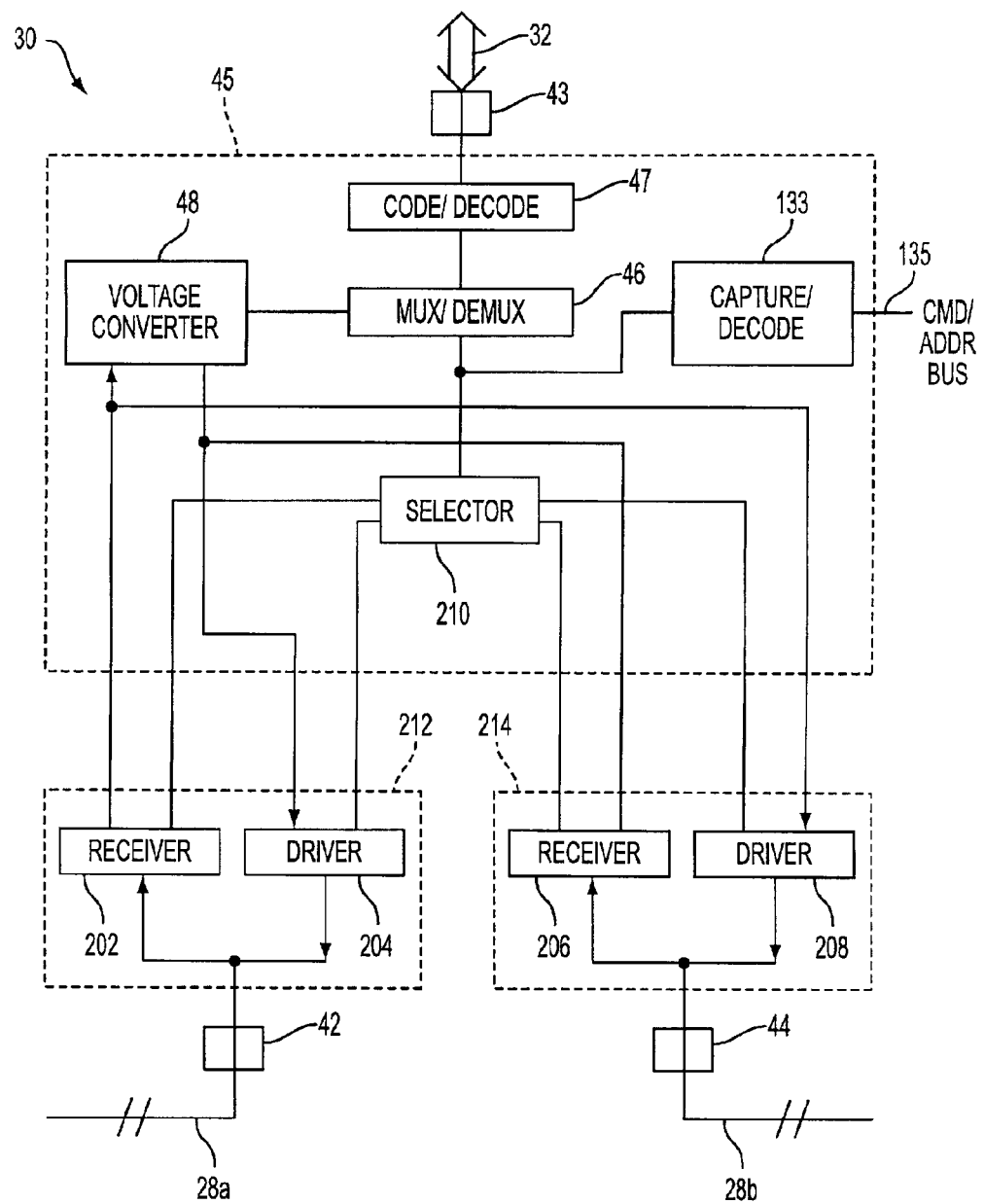
FIG. 2 illustrates in greater detail a portion of FIG. 1.

Referring to FIG. 2, each integrated interface circuit 30 may be connected to the segmented data bus 28 by first 42 and second 44 sets of I/O pins (pads). A first set of I/O pins 42 may be connected to a first bus segment 28a and a second set of I/O pins 44 may be connected to a second bus segment 28b. The first set of I/O pins 42 may be connected to a first receiver set 202 and a first driver set 204, and the second set of I/O pins 44 may be connected to a second receiver set 206 and a second driver set 208.

Although FIG. 2 shows only one data path for each receiver and driver, it should be understood that each segment 28a, 28b of the data bus 28 may be comprised of a plurality of data paths, and therefore a respective plurality of receivers and drivers may be connected to the data paths of the data bus 28 in accordance with the invention.

Figure 11:
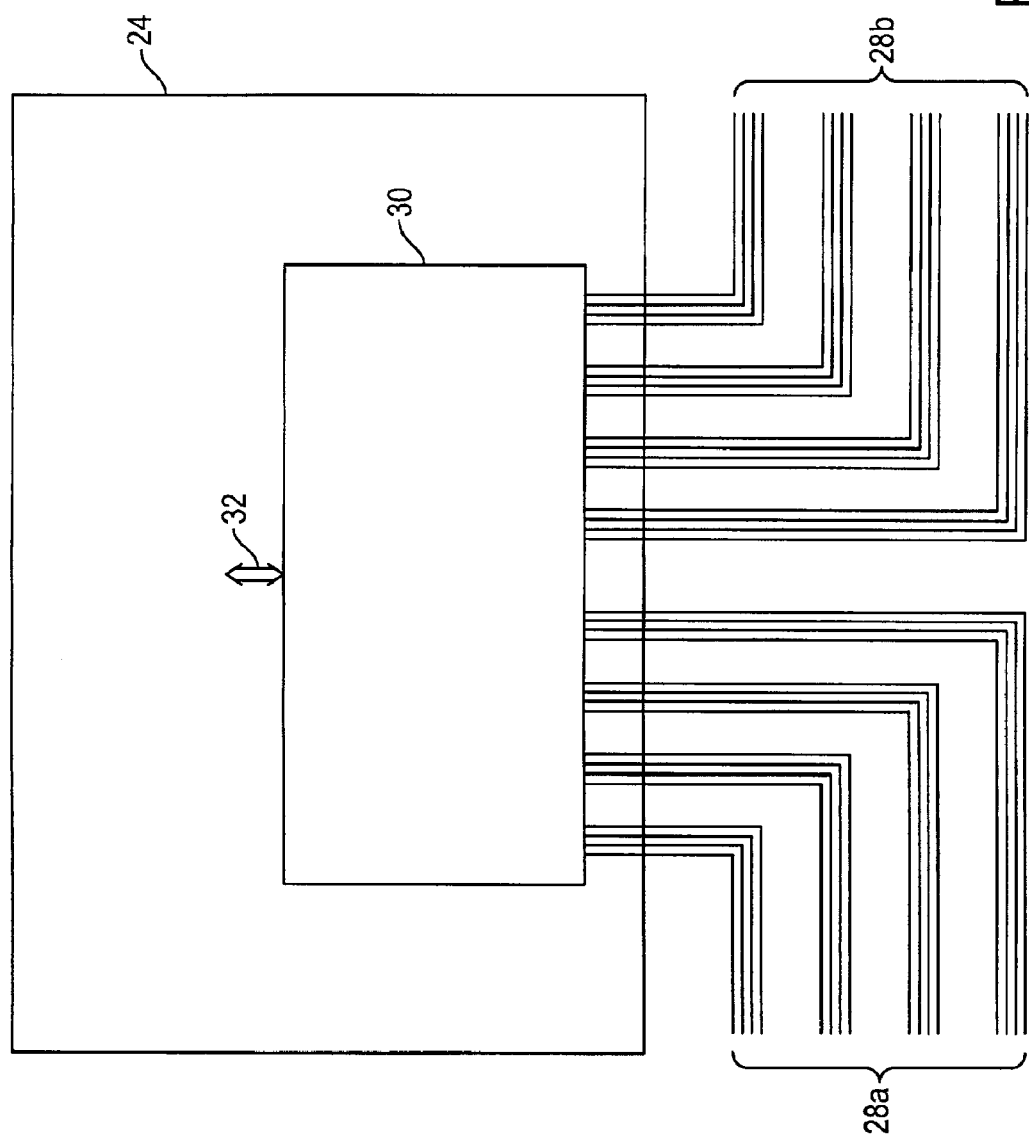
FIG. 11 illustrates a portion of the topology of FIG. 1 in accordance with another exemplary embodiment of the invention.

The first receiver 202 and first driver 204 comprise a first receiver and driver pair 212, and the second receiver 206 and second driver 208 comprise a second receiver and driver pair 214. The first and second receiver and driver pairs 212, 214 may be connected to a conversion circuit 45 which converts data appearing on the segmented data bus 28 for use on a second bus 32. For the example earlier described of a 16 bit data path on bus 28 and a 64 bit data path on bus 32, each set of I/O pins 42 and 44 contains 16 pins for the data path, as shown in FIG. 11.

Figure 15:
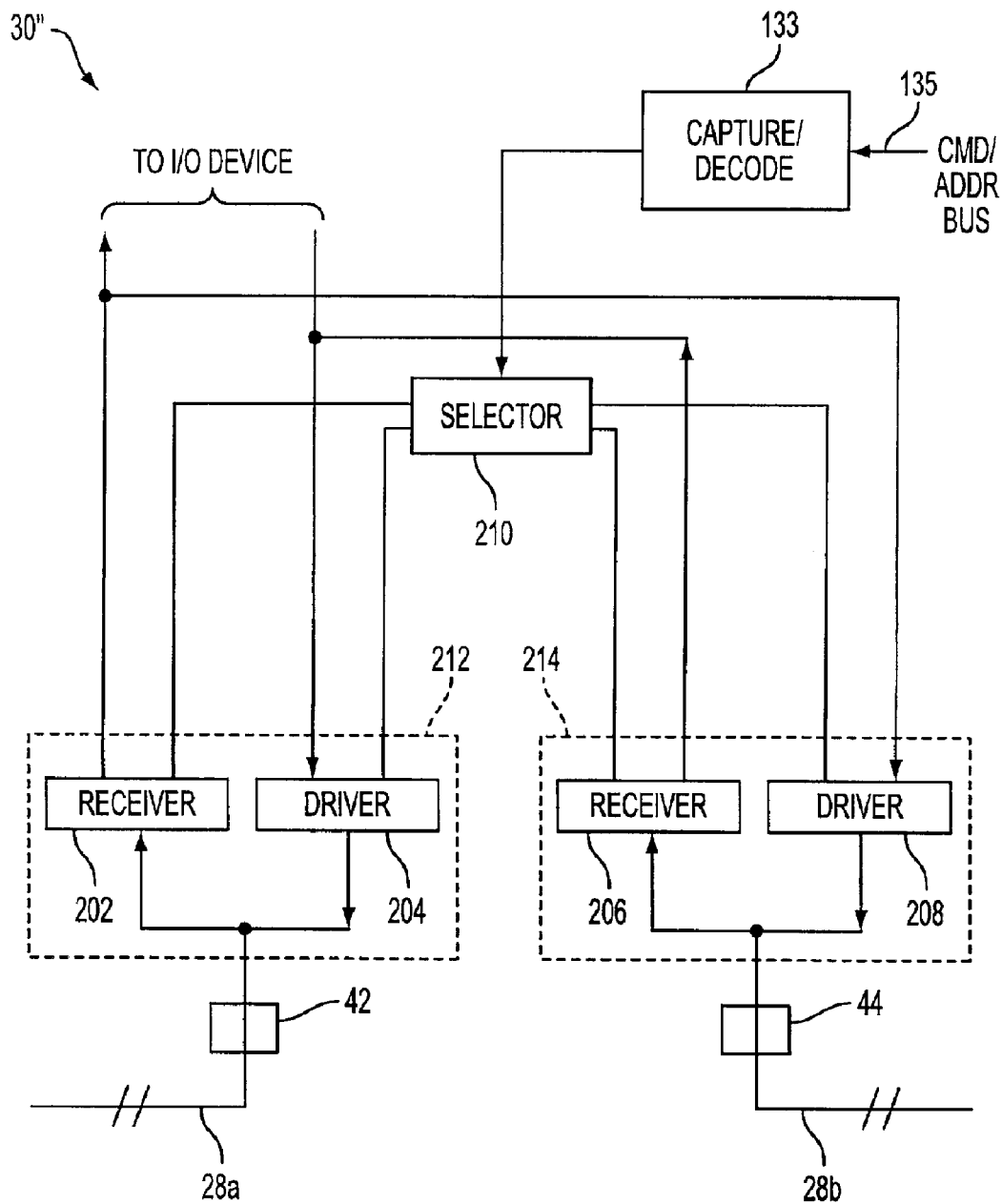
FIG. 15 illustrates a portion of a bus topology in accordance with another exemplary embodiment of the invention.

It should be understood that connection to a conversion circuit 45 is not required, and instead, the first and second receiver and driver pairs 212, 214 may be connected directly to an I/O device (e.g., a memory device), as illustrated in FIG. 15. Thus, the first and second receiver and driver pairs 212, 214 may be integrated into other system components and may be located, for example, on a memory device (e.g., 54), or on a memory module (e.g., 24).

Referring back to FIG. 2, each of the connections between the integrated interface circuit 30 and the buses or bus segments, such as the second data bus 32 and the segmented data bus segments 28a, 28b, may comprise a set of I/O pins 42, 43, 44. Data on one of the data bus segments 28a, 28b may be received and optionally placed on the other of the data bus segments 28b, 28a through the first and second sets of I/O pins 42, 44 using the first and second receiver and driver pairs. Data may also be optionally received by the interface circuit 30 and converted in conversion circuit 45 for use on the second bus 32.

Data may be selectively received and/or placed on the bus segment 28a by the interface circuit 30 using the first receiver/driver pair according to a selection signal received at the integrated interface circuit 30. The selection signal may be available to the interface circuit 30 on a conventional memory system command and address bus 135, as shown in FIGS. 2 and 15. For example, signals received from a conventional command and address bus 135 are captured and decoded by circuitry 133 and may contain instructions for controlling reception of data at integrated interface circuit 30, for example, a WRITE command directing the integrated interface circuit 30 to receive data available on the segmented data bus 28 for storage at one or more memory devices connected to the second data bus 32. The command and address bus 135 may also provide each memory module 24, 26 with address signals for read and write operations.

In addition, the selection signals received at the interface circuit 30 may be transmitted to a selector circuit 210. The selector circuit 210 controls the operation of each of the receivers 202, 206 and drivers 204, 208 according to the contents of the selection signal. For example, when the selection signal selects the one or more memory devices attached to the interface circuit 30 via the second bus 32 for READ or WRITE operations, the selector circuit 210 may deactivate the second receiver/driver pair 214 so that the interface circuit 30 may be connected through the first receiver/driver pair 212 in a point-to-point data communication path with a memory controller 31 (FIG. 1) coupled to the bus segment 28*a*. On the other hand, when the selection signal selects a memory device not attached to the interface circuit 30, the selector circuit 210 may instruct the first and second receiver/driver pairs 212, 214 to pass data on one segment 28*a*, 28*b* through to the other segment 28*b*, 28*a* of the segmented data bus 28. During pass through of data, the drivers 208, 204 may simply repeat data received on corresponding receivers 202, 206 attached to the other bus segment, and thus the pass through of data may also be known as "repeating" of data. For, e.g., a memory subsystem, the interface circuit 30 may be dubbed a "memory repeater."

Figure 13:
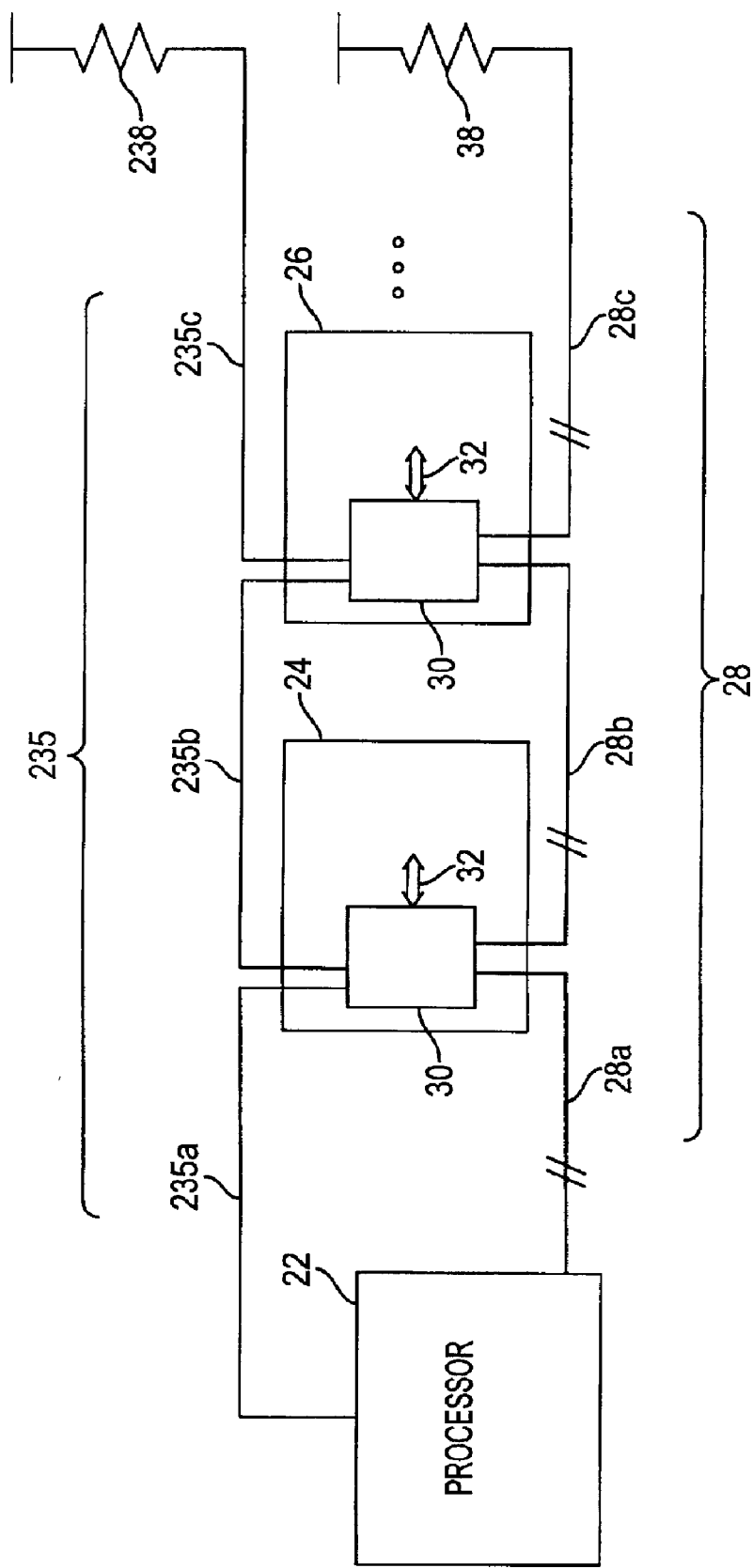
FIG. 13 illustrates a bus topology formed in accordance with another exemplary embodiment of the invention.

In an alternative embodiment illustrated in FIG. 13, selection signals may be made available to the interface circuit 30 on a segmented command and address bus 235 having a construction similar to the segmented data bus 28 for passing selection signals and other information used by the interface circuit 30. Referring to FIG. 13, the segmented command and address bus 235 may include segments 235*a*, 235*b*, 235*c*, connecting the integrated interface circuits 30 of the system input/output devices 24, 26, and may be terminated by a bus terminator 238.

An alternative to the use of selection signals such as those provided on the command and address bus 135 is to embed selection signals in signals transmitted on the segmented data bus 28 shown in FIG. 1 during times when no data is being transmitted.

Referring again to FIG. 2, the second data bus 32 may have operating requirements that differ from those of segmented data bus 28, for example the second data bus 32 may be a higher pin count, higher voltage, lower data rate bus that uses a data encoding different from that of the segmented data bus 28. Therefore, the conversion circuit 45 may convert the data received from the segmented data bus 28 for use on the second data bus 32. The conversion circuit may include a multiplexer/demultiplexer 46 for converting the data rate and number of data paths (e.g., between 16 and 64 data paths), a coder/decoder 47 for appropriately coding/decoding the data between buses 28 and 32, and a voltage converter 48, which permit data available on the segmented data bus 28 to be appropriately configured for the second bus 32 and vice versa.

Figure 3:
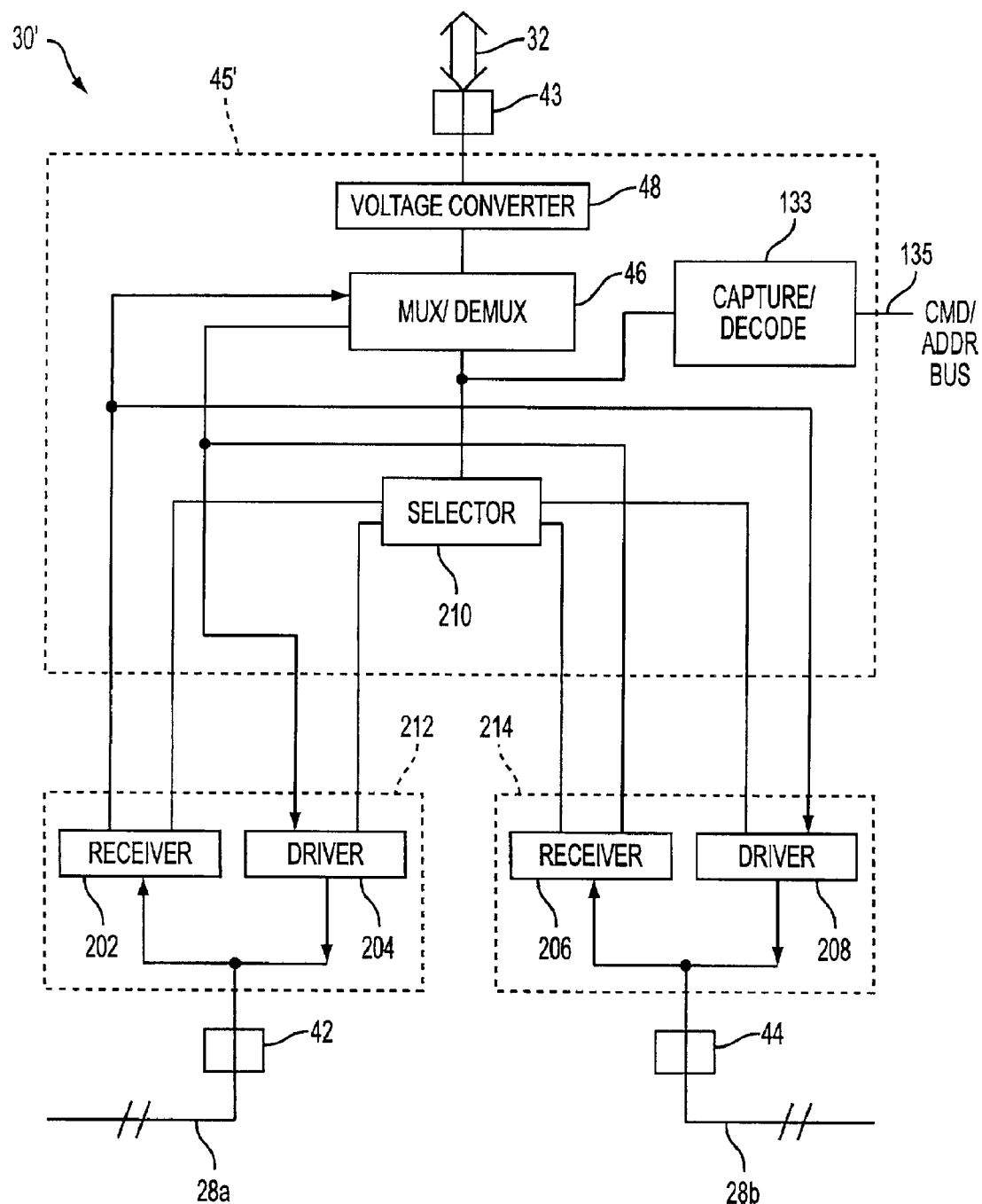
FIG. 3 illustrates another embodiment of the portion shown in FIG. 2.

As shown in FIG. 2, voltage conversion may be performed using a voltage converter 48 provided between the segmented data bus 28 and the multiplexer/demultiplexer 46. This is not required, however, and as illustrated in the integrated interface circuit 30' shown in FIG. 3, voltage conversion may instead be performed at a voltage converter 48 located between the second data bus 32 and the multiplexer/demultiplexer 46.

Referring back to FIG. 2, the conversion circuit 45 may convert data on the segmented data bus 28 for use on the second data bus 32. In addition, the corresponding conversion in the opposite direction (i.e., from the second data bus 32 to the segmented data bus 28) may also be performed by the conversion circuit 45 in accordance with the invention.

The integrated interface circuit 30 may be turned off when the second data bus 32 is not active, for example in response to selection signals received on the command and address bus 135. When the second data bus 32 is not active, data appearing on one segment, e.g., segment 28*a*, of the segmented data bus 28 may be repeated on another segment, e.g., segment 28*b*, using the first and second receiver and driver pairs 212, 214. As shown in FIG. 2, the receiver 202 is connected to the driver 208, and the receiver 206 is connected to the driver 204, so that data received on one segment 28*a*, 28*b* may be repeated on the other segment 28*b*, 28*a*. For example, data received from bus segment 28*a* at receiver 202 may be repeated on bus segment 28*b* using driver 208.

In contrast, when the second data bus 32 is active, for example when a selection signal received on the command and address bus 135 selects a device connected to the second data bus 32, one of the receiver and driver pairs 212, 214 may be deactivated. For example, if a memory controller 31 requests READ data from a memory device coupled to second data bus 32, the first receiver and driver pair 212 is activated and the second receiver and driver pair 214 is deactivated. Because the second receiver/driver pair 214 is deactivated, the second bus segment 28*b* is not used during the READ operation. Communications between the memory controller 31 and the integrated interface circuit 30 may thus proceed using a point-to-point data connection through first receiver/driver pair 212 and first bus segment 28*a*.

The integrated interface circuit 30 allows devices of different technologies to communicate and exchange data. For example, data may be exchanged between a processor and memory modules 24, 26 (either directly or through the memory controller 31) at high speed using the segmented data bus 28, while the second data bus 32 may connect to memory devices that operate at a lower speed. In this example, the slower data rate of the bus 32 connected to the memory devices allows for the use of inexpensive memory integrated circuits (ICs).

Moreover, use of a segmented data bus 28 may permit the construction of a non-parallel terminated network of devices. Referring to FIG. 1, each of the devices on the bus, including the memory controller 31 and other system devices 24, 26, is connected to respective segments 28*a*, 28*b*, 28*c* of the segmented data bus 28 to form a "daisy chain." The segmented data bus 28 is terminated at a bus terminator 38; however, in some lower data rate systems, it may be possible to remove the bus terminator since the bus is substantially stubless. Such a bus system may permit implementation of a memory subsystem with smaller drivers of lower capacitance, lower voltage level due to the lack of a termination resistor in the individual segments 28*a*, 28*b* (i.e., no DC load current), and having decreased power consumption.

Figure 10:
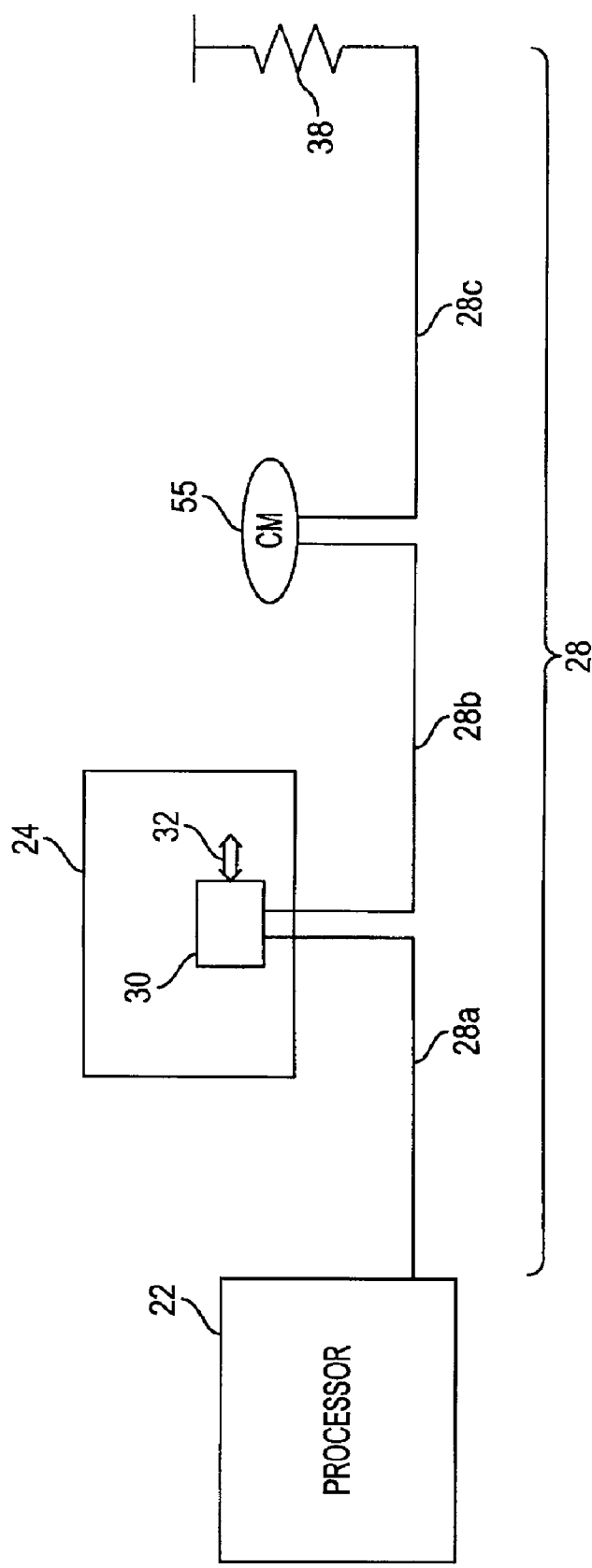
FIG. 10 illustrates a bus topology formed in accordance with another exemplary embodiment of the invention.

When a device is removed from segmented data bus 28, e.g., a memory module is absent, a low cost jumper 55 or other simple continuity module (CM) may be used to maintain the continuity of the bus 28, as shown in FIG. 10.

Figure 4:
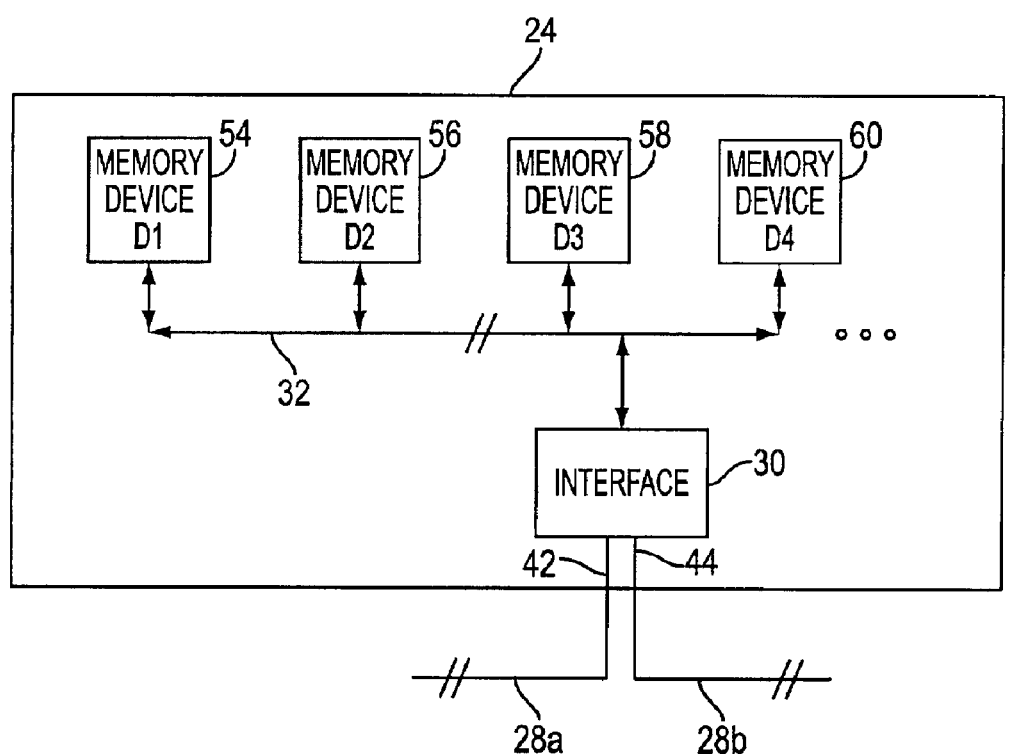
FIG. 4 illustrates a memory module formed in accordance with another exemplary embodiment of the invention.

As noted, one potential use of segmented bus 28 is for a memory system including memory modules 24, 26. FIG. 4 illustrates one of the memory modules 24, which includes a plurality of memory devices 54, 56, 58, 60, mounted on a printed circuit board with the integrated interface circuit 30. Each of the memory devices 54, 56, 58, 60 is connected to a memory bus 32 that also connects to the integrated interface circuit 30. In addition, the integrated interface circuit 30 connects to the segmented data bus 28 using the first and second sets of I/O pins 42, 44.

In operation, the integrated interface circuit 30 receives data from another device connected to the segmented data bus 28, e.g., from a memory controller 31, converts the data for use on the memory bus 32, and transmits the data on the memory bus 32 to the individual memory devices 54, 56, 58, 60. The integrated interface circuit 30 also receives data available on the memory bus 32 and converts the data for use on the segmented data bus 28. Any necessary data rate, voltage, or other conversions which may be required for data to be exchanged between the segmented data bus 28 and the memory bus 32, for example between the memory controller 31 and the memory devices 54, 56, 58, 60, are performed at interface 30. For example, referring to FIGS. 1 and 4, the integrated interface circuit 30 may be connected to the memory controller 31 via the segmented data bus 28, which operates at a 1 Gbit/sec data rate, 1 volt voltage level, and a narrow bus width (low pin count) of 16 data paths (bits). In contrast, the memory bus 32, connected to the integrated interface circuit 30, may operate at a 250 Mbit/sec data rate, 1.8 volt voltage level, and a wide bus width (high pin count) of 64 data paths (bits). For a memory WRITE operation initiated by the processor 22 or the memory controller 31 to store data using the memory devices 54, 56, 58, 60, the WRITE data is transmitted on the segmented data bus 28 from the memory controller 31 to the integrated interface circuit 30, the WRITE data is converted, and transmitted on the memory bus 32 to one or more of the memory devices 54, 56, 58, 60. READ data from the memory devices 54, 56, 58, 60 flows in the opposite direction to the memory controller 31.

Figure 14:
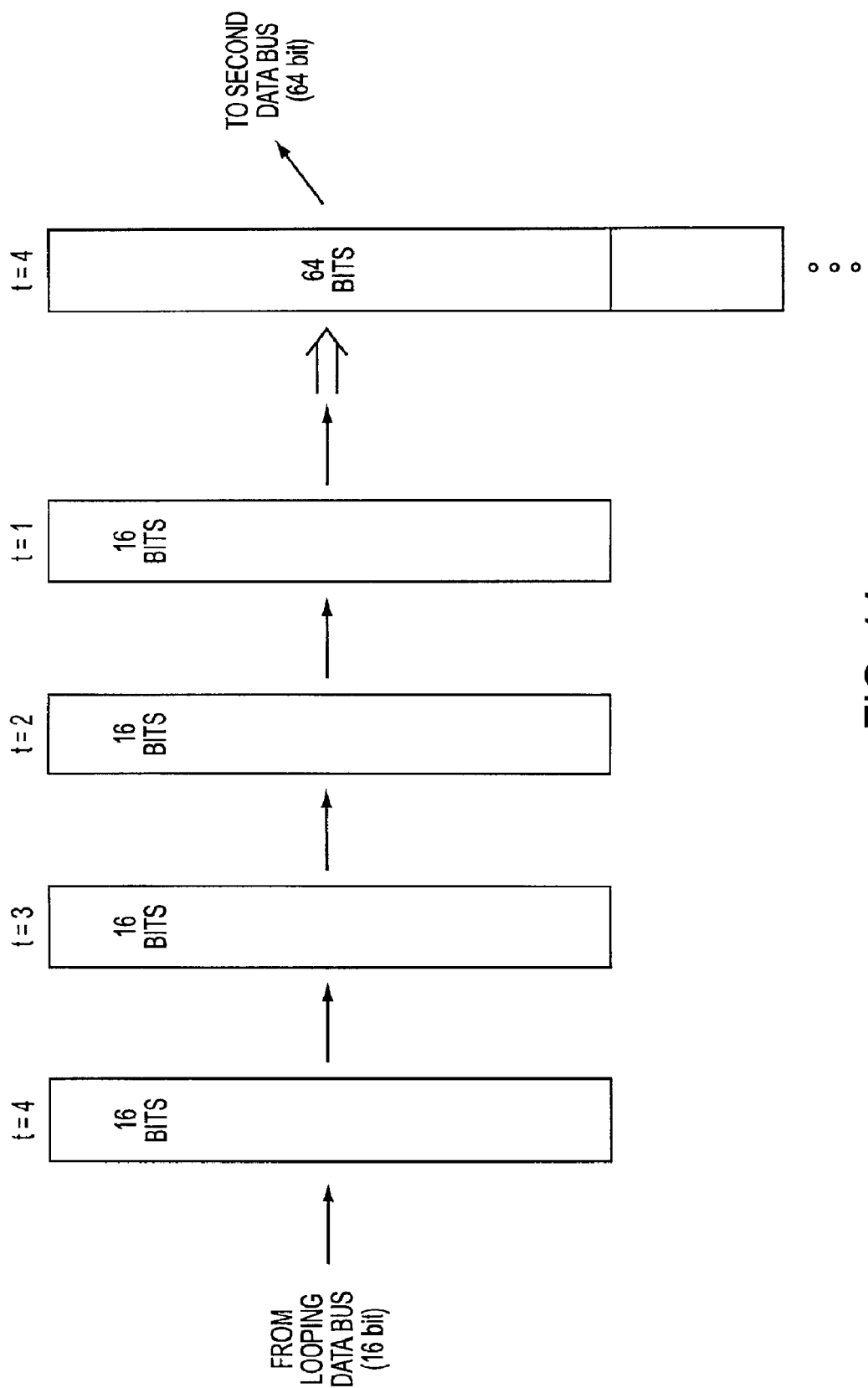
FIG. 14 illustrates a timing example in accordance with an exemplary embodiment of the invention.

FIG. 14 illustrates a timing example for data exchange between a 16-bit segmented data bus 28 and a 64-bit memory bus 32. The integrated interface circuit 30 may receive 16 bits of data at time t=1, t=2, t=3, and t=4. At time t=4, after the integrated interface circuit 30 has received a total of 64 bits of data, from the segmented data bus 28, the received data may be passed to the memory bus 32 via the 64 data paths of the memory bus 32. This data rate conversion and/or buffering may be performed using the multiplexer/demultiplexer 46 (FIG. 2). Any other voltage conversions or data encoding/decoding functions needed are performed at the interface circuit 30 as described above and illustrated in FIGS. 2 and 3.

For a memory READ operation, the converse data transfer operation from the memory devices 54, 56, 58, 60, to the memory controller 31 is performed. That is, 64 bits of data on bus 32 are multiplexed by interface circuit 30 as four 16 bit data segments which are sequentially placed on segmented data bus 28.

Figure 5:
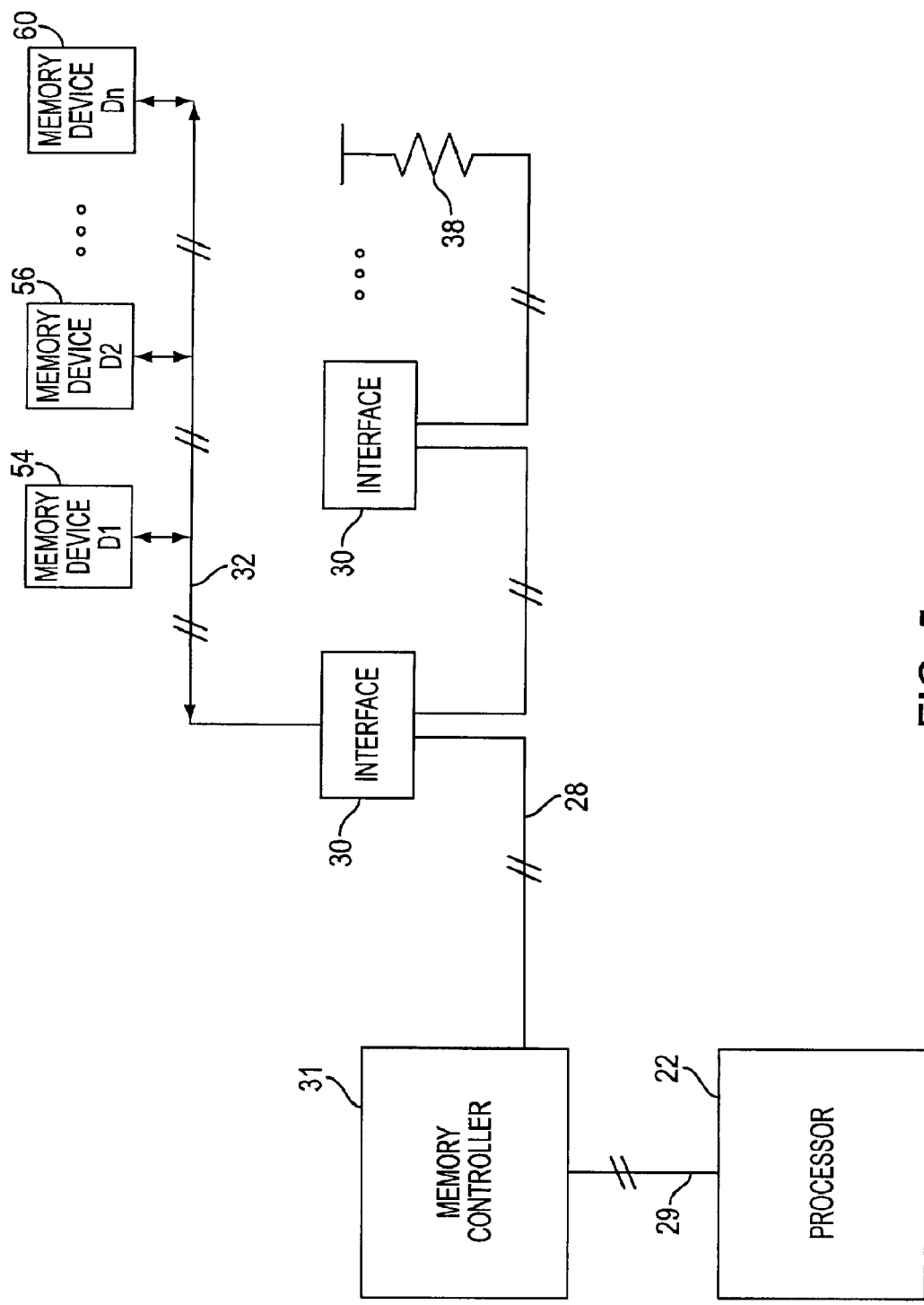
FIG. 5 illustrates a bus topology formed in accordance with another exemplary embodiment of the invention.

FIGS. 4–5 also illustrate that the memory devices 54, 56, 58, 60, attached to the memory bus 32 may be mounted on a single memory module 24 (FIG. 4) or, alternatively, may be mounted on respective printed circuit boards (PCBs) or other support structure (FIG. 5), but nevertheless each memory device 54, 56, 58, 60 is connected to the memory bus 32.

The memory controller 31 is connected to the segmented data bus 28 and may exchange data with each of the integrated interface circuits 30. Alternatively, as shown in FIG. 10, the memory controller 31 may be omitted and the processor 22 may be connected to the segmented data bus 28. In this arrangement, the processor 22 may exchange data over the segmented data bus 28 with the integrated interface circuit 30, which in turn communicate with memory devices on the memory module 24 over the second data bus 32.

The embodiment illustrated in FIG. 10 advantageously eliminates the need for a separate memory controller chip conventionally used as an intermediary between the processor and the memory devices in a typical computer system. For an exemplary system in which the integrated interface circuit 30 adds latency to data communications between devices connected to the segmented data bus 28 and the second data bus 32 (FIG. 1), losses in performance may be alleviated by eliminating the conventional memory controller. Some functions formerly provided by a conventional memory controller, such as memory address-to-module mapping, may be performed instead at the processor 22. Other functions formerly performed by a conventional memory controller, such as voltage conversion, may be performed by the integrated interface circuit 30. Thus, the latency associated with the memory controller may be mitigated while still permitting processors and memory devices of differing voltage levels to interoperate.

Latency could also be improved by including an additional multiplexer in the integrated interface circuit 30 for performing multiplexing tasks ordinarily performed at individual memory devices on the second data bus 32. This would allow the multiplexing tasks to be performed at the higher operating rate of the integrated interface circuit 30.

Figure 6:
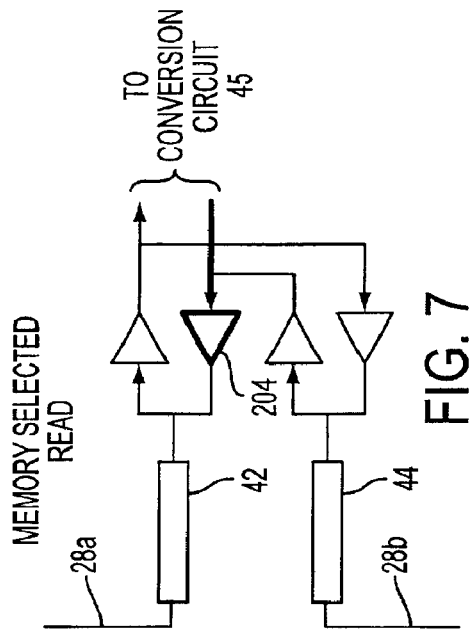
FIG. 6 illustrates a mode of operation of an exemplary embodiment of the invention.
Figure 7:
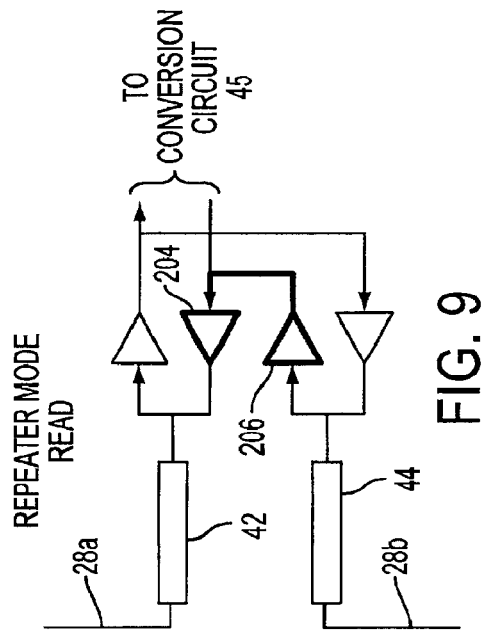
FIG. 7 illustrates another mode of operation of an exemplary embodiment of the invention.
Figure 8:
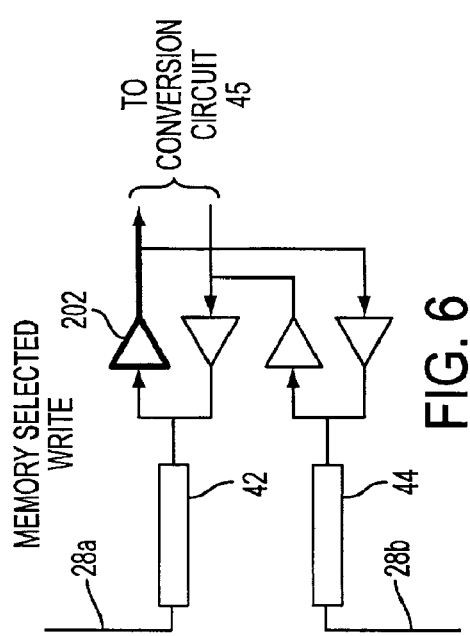
FIG. 8 illustrates another mode of operation of an exemplary embodiment of the invention.
Figure 9:
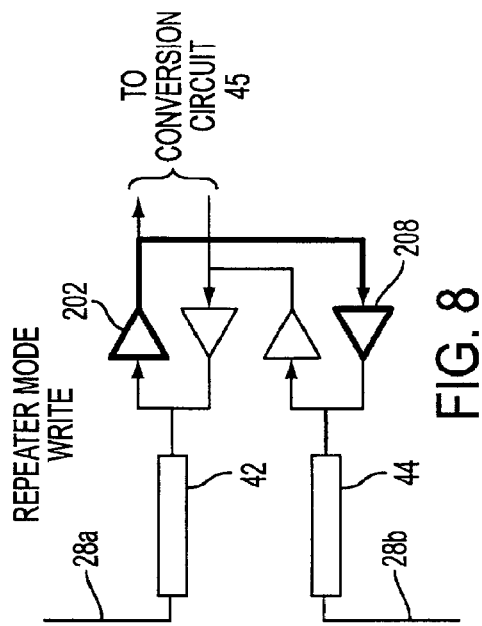
FIG. 9 illustrates another mode of operation of an exemplary embodiment of the invention.

FIGS. 6–9 illustrate four different operating modes of the interface circuit 30, for the example of a memory subsystem. FIGS. 6 and 7 illustrate operations when the interface circuit 30 is selected for memory WRITE and READ operations, respectively. FIGS. 8 and 9 illustrate operations when the interface circuit 30 is not selected for operations, but instead is required to repeat data appearing on the segmented data bus 28 for use by another device. Of course, these-operating modes are not required, and other operating modes may be defined and executed in accordance with the invention.

FIG. 6 illustrates the "SELECT MODE WRITE" operational mode. This mode is used when data is received from one or more devices connected to the segmented data bus 28, for example a processor 22 connected to the first segment 28a, and intended for use at one or more devices connected to the second data bus 32, for example memory devices. In this mode, the first receiver 202 receives data on the first segment 28a of the segmented data bus 28 and forwards the received data to the conversion circuit 45. The data is not re-transmitted on the second segment 28b of the segmented data bus 28.

FIG. 7 illustrates the "SELECT MODE READ" operational mode. This mode is used when data is received from one or more devices connected to the second data bus 32, for example memory devices, and intended for use at one or more devices connected to the segmented data bus 28, for example a processor 22 connected to the first segment 28a. In this mode, the first driver 204 receives data from the conversion circuit 45 and transmits the received data to another device on the segmented data bus 28, for example to the processor 22 connected to the first segment 28a.

FIG. 8 illustrates the "REPEATER MODE WRITE" operational mode. This mode is used when data is received from one or more devices connected to the first segment 28a of the segmented data bus 28, for example a processor 22 connected to the first segment 28a, and intended for use at one or more other devices connected to the second segment 28b of the segmented data bus 28, for example at memory module 26 (FIG. 1) connected to the second segment 28b. In this mode, the first receiver 202 receives data on the first segment 28a and the second driver 208 places the received data on the second segment 28b for transmission to, e.g., the memory module 26, connected to the segment 28b of the segmented data bus 28.

FIG. 9 illustrates the "REPEATER MODE READ" operational mode. This mode is used when data is received from one or more devices connected to the second segment 28b of the segmented data bus 28, for example memory module 26 (FIG. 1), and intended for use at one or more other devices connected to the first segment 28a of the segmented data bus 28, for example a processor 22. In this mode, the second receiver 206 receives data on the second segment 28b and the first driver 204 places the received data on the first segment 28a for transmission to, e.g., the processor 22, connected to the first segment 28a of the segmented data bus 28.

Figure 12:
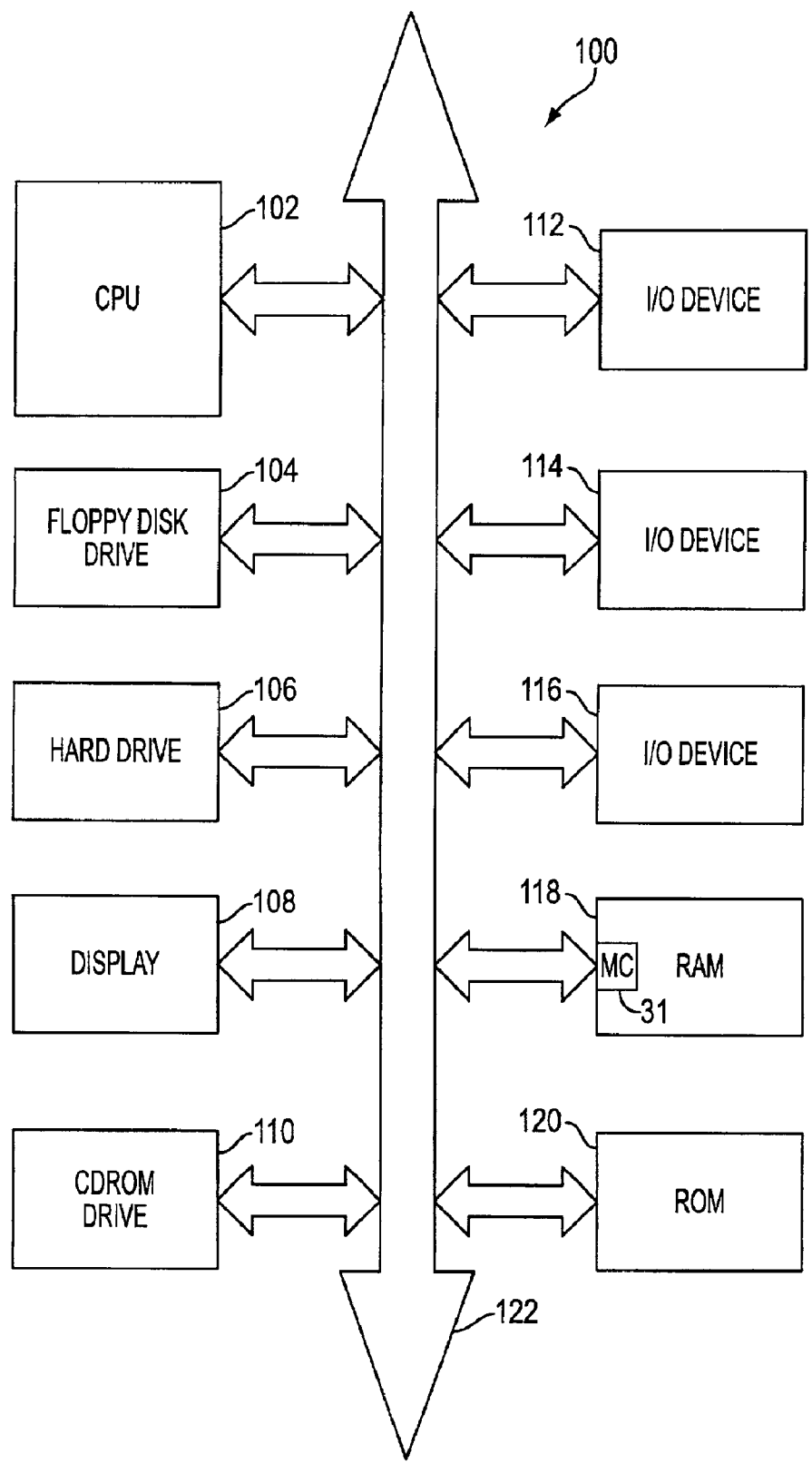
FIG. 12 illustrates a processor system formed in accordance with another exemplary embodiment of the invention.

FIG. 12 illustrates another exemplary processor system which may include a segmented data bus 28. Referring to FIG. 12, the processor system, which may be a computer system 100, for example, generally comprises a central processing unit (CPU) 102, for example, a microprocessor, that communicates with one or more input/output (I/O) devices 112, 114, 116 over a system bus 122. The computer system 100 also includes random access memory (RAM) 118, a read only memory (ROM) 120 and, in the case of a computer system may include peripheral devices such as a floppy disk drive 104, a hard drive 106, a display 108 and a compact disk (CD) ROM drive 110 which also communicate with the processor 102 over the bus 122. The RAM 118 includes memory devices communicating with a memory controller 31 via a segmented data bus 28 and associated receiver/driver pairs 212, 214 constructed in accordance with the invention. This configuration of the computer system 100 permits high speed communication and/or data transfer between different types of data devices, for example between the processor 102 and the memory controller 31 at the RAM 118. It should be noted that FIG. 12 is merely representative of many different types of processor system architectures which may employ the invention.

Although the segmented data bus 28 has been described with reference to a digital data system, e.g., a memory system having memory modules 24, 26, the segmented data bus 28 can be used to transmit signals of any types, including analog, digital and radio frequency (RF) signals.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A data transfer interface, comprising:
   a first receiver and driver pair coupled to a first segment of a first data bus, said first receiver and driver pair being configured to receive data on said first segment using said first receiver and selectively place data on said first segment using said first driver;
   a second receiver and driver pair coupled to a second segment of said first data bus, said second receiver and driver pair being configured to receive data on said second segment using said second receiver and selectively place data on said second segment using said second driver; and
   a selector circuit connected to said first and second receiver and driver pairs, said selector circuit selectively operating said first and second receiver and driver pairs according to a state of a command/address bus coupled to said selector circuit such that in a first state of said command/address bus said first receiver and driver pair passes data between said first bus segment and an I/O device and bypasses said second bus segment, and in a second state of said command/address bus said first and second receiver and driver pairs pass data between respective adjacent bus segments and bypass said I/O device wherein said first and second segments of said first data bus is of a first data width and said I/O device is of a second data width, said first and second data widths being unequal.

2. An interface as in claim 1, wherein said I/O device comprises a memory device.

3. An interface as in claim 1, wherein said I/O device comprises a second data bus.

4. A data transfer interface, comprising:
   a first receiver and driver pair coupled to a first segment of a first data bus, said first receiver and driver pair being connected to receive data on said first segment using said first receiver and selectively place data on said first segment using said first driver;
   a second receiver and driver pair coupled to a second segment of said first data bus, said second receiver and driver pair being connected to receive data on said second segment using said second receiver and selectively place data on said second segment using said second driver;
   a second data bus;
   a device, coupled to said second data bus; and
   an interface circuit coupled to a command/address bus, said first and second receiver and driver pairs, and said second data bus;
   wherein
      said interface circuit is configured, based on a state of said command/address bus, to receive data from said first receiver and selectively place said data for said device on said second data bus and receive data on said second data bus and selectively place said data on said first data bus, and
      said first and second segments of said first data bus is of a first data width and said second data bus is of a second data width, said first and second data widths being unequal.

5. The interface of claim 4, wherein said first receiver and driver pair is coupled to said first segment via a first set of I/O pins, and said second receiver and driver pair is coupled to said second segment via a second set of I/O pins.

6. The interface of claim 4, wherein said interface circuit further comprises at least one of a multiplexer and demultiplexer that performs a data rate conversion between said first and second data buses.

7. The interface of claim 4, wherein said interface circuit further comprises a multiplexer and a demultiplexer which perform data rate conversions for data received on said first data bus that is placed on said second data bus and for data received on said second data bus that is placed on said first data bus.

8. The interface of claim 4, wherein said interface circuit further comprises at least one of a coder and decoder that performs at least one of a data encoding and decoding conversion between said first and second data buses.

9. The interface of claim 4, wherein said interface circuit further comprises a voltage converter that performs a voltage level conversion between said first and second data buses.

10. The interface of claim 4, wherein said second data bus is connected to at least one memory device.

11. The interface of claim 4, wherein said first data bus is connected to a memory controller.

12. The interface of claim 4, wherein said first data bus is connected to a processor.

13. The interface of claim 4, wherein said first data bus operates at a first data rate faster than a second data rate at which said second data bus operates.

14. The interface of claim 4, wherein said first data bus operates at a first voltage level less than a second voltage level at which said second data bus operates.

15. The interface of claim 4, wherein said first data bus transmits analog signals.

16. The interface of claim 4, wherein said first data bus transmits digital signals.

17. The interface of claim 4, wherein said first data bus transmits radio-frequency (RF) signals.

18. The interface of claim 4, wherein said first data bus is a substantially stubless data bus.

19. A memory module, comprising:
at least one memory device, each one of said at least one memory device being disposed on an integrated circuit, and comprising:
  a memory; and
  a data transfer interface connected to a first data bus and to said at least one memory device by a second data bus, said data transfer interface comprising:
    a first receiver and driver pair coupled to a first segment of a first data bus, said first receiver and driver pair being connected to receive data on said first segment using said first receiver and selectively place data on said first segment using said first driver;
    a second receiver and driver pair coupled to a second segment of said first data bus, said second receiver and driver pair being connected to receive data on said second segment using said second receiver and selectively place data on said second segment using said second driver; and
    an interface circuit coupled to a command/address bus, said first and second receiver and driver pairs and a second data bus, wherein said interface circuit is configured, based on a state of said command/address bus, to receive data from said first receiver and selectively place said data for the memory on said second data bus, and receive data from the memory on said second data bus and selectively place said data on said first data bus;
    wherein
      said first and second segments of said first data bus is of a first data width and said second data bus is of a second data width, said first and second data widths being unequal; and
      said second bus is coupled to said memory.

20. The memory module of claim 19, wherein said first receiver and driver pair is coupled to said first segment via a first set of I/O pins, and said second receiver and driver pair is coupled to said second segment via a second set of I/O pins.

21. The memory module of claim 19, wherein said interface circuit further comprises at least one of a multiplexer and demultiplexer that performs a data rate conversion between said first and second data buses.

22. The memory module of claim 19, wherein said interface circuit further comprises a multiplexer and a demultiplexer which perform data rate conversions for data received on said first data bus that is placed on said second data bus and for data received on said second data bus that is placed on said first data bus.

23. The memory module of claim 19, wherein said interface circuit further comprises at least one of a coder and decoder that performs at least one of a data encoding and decoding conversion between said first and second data buses.

24. The memory module of claim 19, wherein said interface circuit further comprises a voltage converter that performs a voltage level conversion between said first and second data buses.

25. The memory module of claim 19, wherein said first bus includes a first number of data paths and said second bus includes a second number of data paths, and said first number of data paths is less than said second number of data paths.

26. The memory module of claim 19, wherein said second data bus is connected to at least one memory device.

27. The memory module of claim 19, wherein said first data bus is connected to a memory controller.

28. The memory module of claim 19, wherein said first data bus is connected to a processor.

29. The memory module of claim 19, wherein said first data bus operates at a first data rate faster than a second data rate at which said second data bus operates.

30. The memory module of claim 19, wherein said first data bus operates at a first voltage level less than a second voltage level at which said second data bus operates.

31. The memory module of claim 19, wherein said first data bus transmits analog signals.

32. The memory module of claim 19, wherein said first data bus transmits digital signals.

33. The memory module of claim 19, wherein said first data bus transmits radio-frequency (RF) signals.

34. The memory module of claim 19, wherein said first data bus is a substantially stubless data bus.

35. A data exchange system, comprising:
a first data bus having at least first and second bus segments;
a controller connected to place data on and receive data from said first data bus;
a processor coupled to said controller, and
a data transfer interface, disposed on an integrated circuit and comprising:
  a first receiver and driver pair coupled to a first segment of a first data bus, said first receiver and driver pair being connected to receive data on said first segment using said first receiver and selectively place data on said first segment using said first driver;
  a second receiver and driver pair coupled to a second segment of said first data bus, said second receiver and driver pair being connected to receive data on said second segment using said second receiver and selectively place data on said second segment using said second driver;
  a second data bus;
  a device, coupled to the second data bus; and
  an interface circuit coupled to a command/address bus, said first and second receiver and driver pairs and a second data bus, wherein said interface circuit is configured, based on a state of said command/address bus, to receive data for the device on said first data bus and selectively place said data on said second data bus, and receive data from the device on said second data bus and selectively place said data on said first data bus;
  wherein said first data bus is of a first data width, said second data bus is of a second data width, said first and second data widths being unequal.

36. A method of data communication comprising:
receiving data at first and second receivers coupled to respective first and second segments of a first data bus;
driving data using first and second drivers coupled to said respective first and second segments, said driving being performed according to a state of a command/address bus such that when said command/address bus is in a first state a first receiver and driver pair passes signals between said first segment of said first data bus and an I/O device and bypass said second segment, and when said command/address bus is in a second state said first and a second receiver and driver pairs pass signals between respective adjacent bus segments and bypass said I/O device;

wherein said first data bus is of a first data width, said I/O device is of a second data width, said first and second data widths being unequal.

37. A method as in claim 36, wherein said I/O device comprises a memory device.

38. A method as in claim 36, wherein said I/O device comprises a second data bus.

39. A method of data communication, comprising:

connecting an interface circuit having first and second receiver and driver pairs to respective first and second segments of a first data bus that operates at a first data rate;

connecting said interface circuit to at least one device on a second data bus that operates at a second data rate;

receiving and transmitting data on said first data bus using said first and second receiver and driver pairs;

receiving and transmitting data on said second data bus; and based on a state of an command/address bus coupled to said interface circuit,
 selectively placing data received from said first bus segment on said second bus segment when said command/address bus is in a first state;
 selectively placing data received from said second bus segment on said first bus segment when said command/address bus is in a second state; and
 selectively converting data received from one of said first and second data buses for use on the other of said first and second data buses;

wherein said first data bus is of a first data width, said second data bus is of a second data width, said first and second data widths being different.

40. A method as in claim 39, wherein said first data rate is faster than said second data rate.

41. A method as in claim 39, further comprising converting received data between said first data rate of said first data bus and said second data rate of said second data bus.

42. A method as in claim 39, further comprising converting received data between a first encoding of said first data bus and a second encoding of said second data bus.

43. A method as in claim 39, further comprising converting received data between a first voltage level of said first data bus to a second voltage level of said second data bus.

44. A method as in claim 43, wherein said first voltage level is less than said second voltage level.

45. A method as in claim 39, wherein devices of a first technology communicate with said interface circuit using said first data bus and devices of a second technology communicate with said interface circuit using said second data bus.

46. A method as in claim 45, wherein said devices of said first technology include at least one processor.

47. A method as in claim 45, wherein said devices of said second technology include at least one memory device.

48. A method as in claim 39, wherein said first data bus is a substantially stubless data bus.

* * * * *